US011380344B2

(12) United States Patent
Boerger et al.

(10) Patent No.: US 11,380,344 B2
(45) Date of Patent: Jul. 5, 2022

(54) DEVICE AND METHOD FOR CONTROLLING A SPEAKER ACCORDING TO PRIORITY DATA

(71) Applicant: MOTOROLA SOLUTIONS, INC., Chicago, IL (US)

(72) Inventors: Mark A. Boerger, Plantation, FL (US); Sean Regan, Boca Raton, FL (US); Jesus F. Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 300 days.

(21) Appl. No.: 16/724,840

(22) Filed: Dec. 23, 2019

(65) Prior Publication Data

US 2021/0193158 A1  Jun. 24, 2021

(51) Int. Cl.
  *G10L 21/007* (2013.01)
  *G10L 19/00* (2013.01)
  *H04M 1/72442* (2021.01)

(52) U.S. Cl.
  CPC ............ *G10L 21/007* (2013.01); *G10L 19/00* (2013.01); *H04M 1/72442* (2021.01)

(58) Field of Classification Search
  CPC ................. H04M 1/72442; H04M 1/6016
  See application file for complete search history.

(56) References Cited

U.S. PATENT DOCUMENTS

| 9,136,881 B2 | 9/2015 | Groeschel et al. |
| 2002/0196134 A1 | 12/2002 | Lutter et al. |
| 2005/0213732 A1 | 9/2005 | Rodman |
| 2006/0182289 A1* | 8/2006 | Chu .................. H04R 5/04 381/86 |
| 2007/0218878 A1 | 9/2007 | Khawand et al. |
| 2009/0177965 A1 | 7/2009 | Peralta et al. |
| 2012/0201386 A1* | 8/2012 | Riedmiller .......... G11B 27/322 381/2 |
| 2013/0316679 A1 | 11/2013 | Miller et al. |
| 2014/0093085 A1 | 4/2014 | Jarvis et al. |
| 2014/0277645 A1 | 9/2014 | Thirumale |
| 2018/0262792 A1 | 9/2018 | Mackay et al. |
| 2019/0057584 A1 | 2/2019 | Brayton |
| 2019/0214954 A1 | 7/2019 | Coover et al. |
| 2019/0342687 A1 | 11/2019 | Lai et al. |
| 2020/0076621 A1* | 3/2020 | Lesso ..................... G06F 21/83 |

FOREIGN PATENT DOCUMENTS

| JP | 2014513322 A | 5/2014 |
| TW | 201921340 A | 6/2019 |
| WO | 2012138594 A1 | 10/2012 |

* cited by examiner

*Primary Examiner* — Jesse S Pullias
(74) *Attorney, Agent, or Firm* — Perry + Currier, Inc.

(57) ABSTRACT

A device and method controlling a speaker according to priority data is provided. An audio processor, in communication with a speaker-controlling processor at a device, processes remote audio data, the remote audio data remote to the speaker-controlling processor. The audio processor assigns priority data to the remote audio data. The audio processor provides the remote audio data and the priority data to the speaker-controlling processor. The speaker-controlling processor processes local audio data, the local audio data local to the speaker-controlling processor. The speaker-controlling processor controls a speaker, with respect to the local audio data and the remote audio data, according to the priority data.

14 Claims, 5 Drawing Sheets

DEVICE AND METHOD FOR CONTROLLING A SPEAKER ACCORDING TO PRIORITY DATA

BACKGROUND OF THE INVENTION

Devices that include two processors generally process audio data at both processors, however only one of the processors may control a speaker, that may lead to collisions in how the audio data is played at the speaker.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
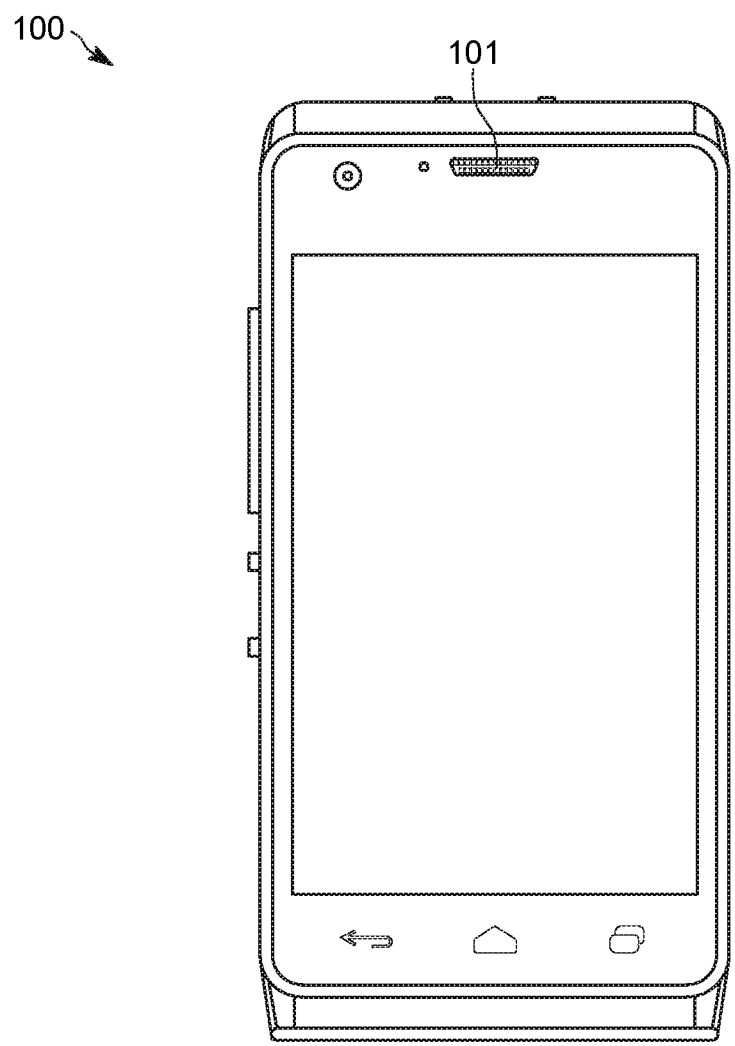
FIG. 1 is a device for controlling a speaker according to priority data, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Devices that include two processors generally process audio data at both processors, however only one of the processors may control a speaker, that may lead to collisions in how the audio data is played at the speaker. While audio data from the two processors may be combined, when one set of the audio includes critical information encoded therein, the audio data may not be played at the speaker in a manner that allows the critical information to be adequately heard by a listener (e.g. an operator and/or user of the device). Such a problem may be particularly acute when the devices are being used by first responders, and the critical information may be important for managing an incident.

Hence, provided herein is a device that includes, a first processing unit and/or processor and/or a baseband processing unit and/or processor that controls a speaker, and hence may also be referred to as a speaker-controlling processing unit and/or processor. The speaker-controlling processing unit and/or processor may process audio data local to the speaker-controlling processing unit and/or processor (e.g. that may be referred to as local audio data). The device further comprises a second processing unit and/or processor and/or an applications processing unit and/or processor that generates and/or receives audio data, and/or remote audio data (e.g. remote from the speaker-controlling processing unit and/or processor), from audio sources, and hence may also be referred to as an audio processing unit and/or processor. The speaker-controlling processing unit and/or processor and the audio processing unit and/or processor are generally in communication with each other, for example via a bus, such as a two-channel bus (e.g. an I2S (Inter-IC Sound) bus, and the like), or a one-channel bus (e.g. a serial bus, a synchronous serial interface (SSI) bus, and the like). The audio processing unit and/or processor is configured to assign priority data to the remote audio data and provide the remote audio data and the priority data to the speaker-controlling processing unit and/or processor, for example via the bus. The speaker-controlling processing unit and/or processor receives the remote audio data and the priority data, and controls the speaker, with respect to the local audio data and the remote audio data, according to the priority data. For example, when the speaker-controlling processing unit and/or processor is processing local audio data and receives the remote audio data and the priority data, the speaker-controlling processing unit and/or processor may mute the local audio data, mix the local audio data with the remote audio data, attenuate the local audio data or the remote audio data, mute the remote audio data, pause and/or buffer the local audio data to provide the remote audio data at the speaker (e.g. and provide the paused and/or buffered local audio data at the speaker after the remote audio data is provided), or pause and/or buffer the remote audio data to provide the local audio data at the speaker (e.g. and provide the paused and/or buffered remote audio data at the speaker after the local audio data is provided), depending on the priority data. Furthermore, in examples where remote audio data is received at the speaker-controlling processing unit and/or processor, and there is no local audio data being processed, the priority data may not be used and/or discarded, and the remote audio data is provided at the speaker (e.g. regardless of the priority data).

While the terms "processing unit" is used throughout the present specification to refer to a processing unit that includes a processor and memory resources (e.g. a random access memory, a code read only memory, and the like) used by the processor, the terms "processing unit" and "processor" may be used interchangeably. For example, reference to functionality of a processing unit or a processor may also be attributed to the other of the processing unit and the processor.

Hence, an aspect of the specification provides a device comprising: a speaker; a speaker-controlling processor configured to: process local audio data, the local audio data local to the speaker-controlling processor; and control the speaker; and at least one audio processor in communication with the speaker-controlling processor, the at least one audio processor configured to: process remote audio data, the remote audio data remote to the speaker-controlling processor; assign priority data to the remote audio data; and provide the remote audio data and the priority data to the speaker-controlling processor, the speaker-controlling processor further configured to control the speaker, with respect to the local audio data and the remote audio data, according to the priority data.

Another aspect of the specification provides a method comprising: processing, at an audio processor, remote audio data; assigning, at the audio processor, priority data to the remote audio data; and providing, from the audio processor to a speaker-controlling processor, the remote audio data and the priority data such that the speaker-controlling processor controls a speaker, with respect to the local audio data and the remote audio data, according to the priority data.

Another aspect of the specification provides a method comprising: processing, at a speaker-controlling processor, local audio data; receiving, at the speaker-controlling processor, from an audio processor, remote audio data and priority data; and controlling, at the speaker-controlling processor, a speaker, with respect to the local audio data and the remote audio data, according to the priority data.

Another aspect of the specification provides a method comprising: processing, at an audio processor in communication with a speaker-controlling processor, remote audio data, the remote audio data remote to the speaker-controlling processor; assigning, at the audio processor, priority data to the remote audio data; providing, at the audio processor, the remote audio data and the priority data to the speaker-controlling processor; processing, at the speaker-controlling processor, local audio data, the local audio data local to the speaker-controlling processor; and controlling, at the speaker-controlling processor, the speaker, with respect to the local audio data and the remote audio data, according to the priority data.

Attention is directed to FIG. 1 that depicts a device 100 comprising a speaker 101. The device 100 is generally for controlling the speaker 101 according to priority data. As depicted, the device 100 comprises one speaker 101 integrated into the device 100, however the device 100 may comprise more than speaker 101 and/or the speaker 101 (and/or one or more speakers 101) may be external to the device 100 (e.g. integrated with a remote speaker microphone (RSM)) and in communication with the device 100 via a local wired and/or wireless communication link.

As depicted, the device 100 comprises a mobile communication device and/or portable device and/or a cell-phone and the like, and includes a display screen and/or other types of input/output devices. However, the device 100 may comprise a mobile radio adapted for use by first responders, and the like, and may specifically comprise a land mobile radio (LMR), and the like, configured with a virtual assistant application, and the like, for assisting first responders in responding to incidents. Such a virtual assistant application may provide critical information for assisting first responders in responding to incidents, and/or any other type of information for assisting first responders in responding to incidents.

However, the device 100 may comprise any suitable portable device, partially portable device, and/or non-portable device. In particular examples, the device 100 may comprise a cell phone (e.g. as depicted in FIG. 1), a radio, a body-worn camera, a first responder device, a laptop computer, a headset, and the like, and/or any device that includes a speaker and/or controls a speaker. Furthermore, while the device 100 is described hereafter as having radio functionality, the device 100 may be generally configured for any suitable audio functionality that may not include radio functionality.

Figure 2:
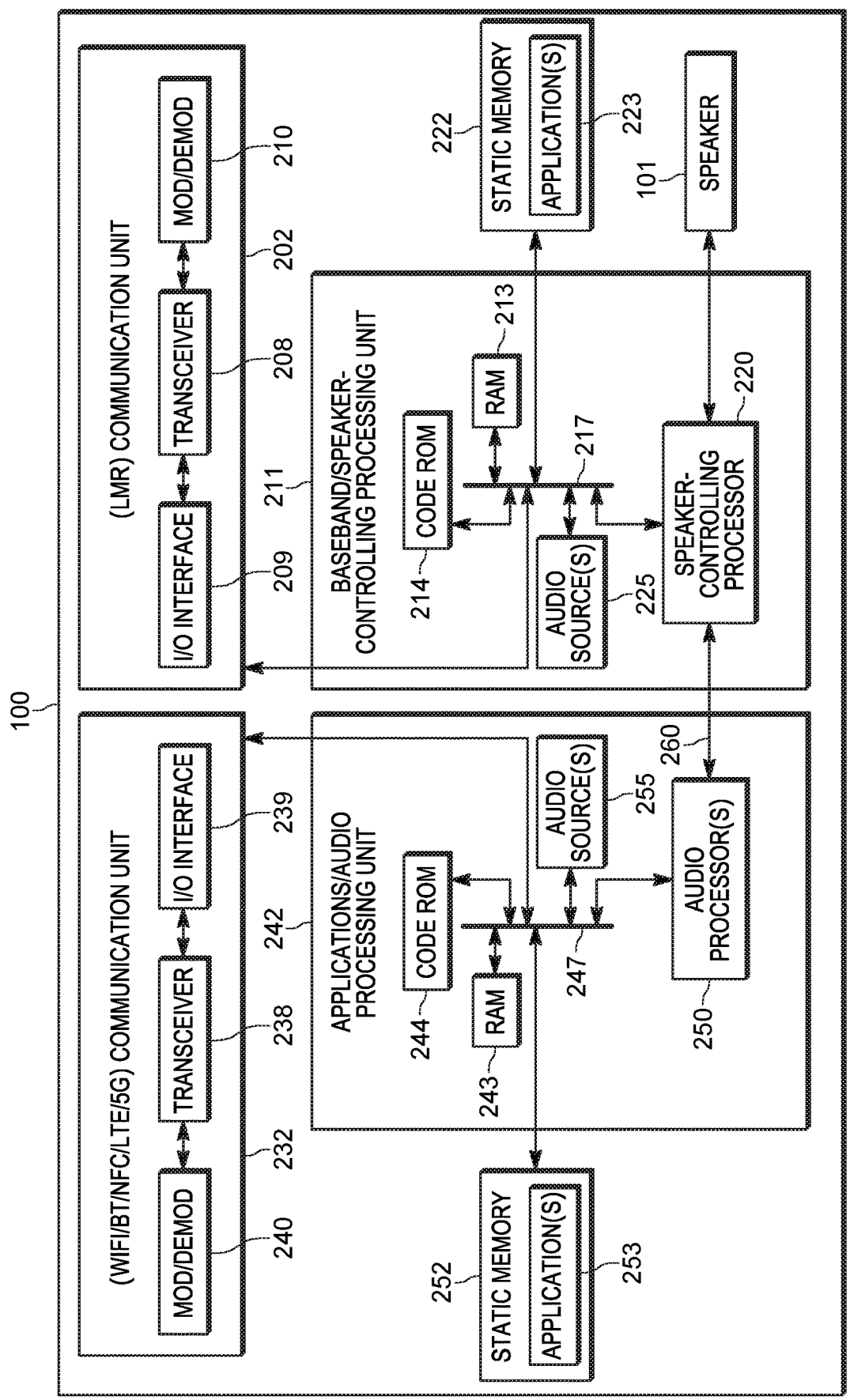
FIG. 2 is a device diagram showing a device structure of the device for controlling a speaker according to priority data, in accordance with some examples.

Attention is next directed to FIG. 2 that depicts a schematic block diagram of an example of the device 100. As depicted, the device 100 comprises: the speaker 101, and a communication unit 202 comprising: one or more wireless transceivers 208, one or more wired and/or wireless input/output (I/O) interfaces 209, a combined modulator/demodulator 210.

As depicted, the device 100 further comprises a baseband and/or speaker-controlling processing unit 211 comprising: a Random-Access Memory (RAM) 213, a code Read Only Memory (ROM) 214, a common data and address bus 217, and a speaker-controlling processor 220. The processing unit 211 is in communication with the communication unit 202 via the bus 217.

The device 100 further comprises a static memory 222 in communication with the processing unit 211 via the bus 217; the memory 222 stores at least one application 223. Hereafter, the at least one application 223 will be interchangeably referred to as the application 223.

As depicted, the communication unit 202 comprises a land-mobile radio (LMR) communication unit, described in more detail below. Furthermore, the memory 222 and/or the application 223 may generally be for providing memory and/or instructions to the speaker-controlling processing unit 211 and/or processor 220. Indeed, the speaker-controlling processor 220 may comprise a digital signal processor (DSP) configured to control the speaker 101 from audio sources of the device 100 that may include LMR communications, and the like, from the communication unit 202 and/or any other sources of audio data of the device 100, as described below.

For example, as depicted, the processing unit 211 comprises other audio sources 225 that may include, but is not limited to, other processors (e.g. a host processor), a tone generator (e.g. for generating system alert tones, and the like), a voice playback processor, and the like. For example, the audio sources 225 may include one or more processors for converting LMR communications from the communication unit 202 to audio data, generating alerts in the form of tones (e.g. system alert tones, and the like), etc. for playback at the speaker 101 by the speaker-controlling processor 220. As depicted, the audio sources 225 (which may be as few as one audio source 225) are located on the common bus 217. Hence, audio data may be received at the processing unit 211 from the communication unit 202, described in more detail below, and/or other the processing unit 211 may receive and/or generate audio data via the other audio sources 225.

Furthermore as depicted, the device 100 further comprises: a second communication unit 232 comprising one or more second wireless transceivers 238, one or more second wired and/or wireless input/output (I/O) interfaces 239, and a second combined modulator/demodulator 240.

The device 100 further comprises at least one applications and/or audio processing unit 242 comprising: respective RAM 243, a respective ROM 244, a respective common data and address bus 247, and an audio processor 250. The processing unit 242 is in communication with the communication unit 232 via the bus 247. In some examples, the device 100 may comprise more than one audio processing unit 242 and/or more than one audio processor 250 (e.g. the audio processing unit 242 may comprise more than one audio processor 250 and/or the device 100 may comprise more than one audio processing unit 242 each comprising a respective audio processor 250).

As depicted, the device 100 further comprises a second static memory 252 in communication with the processing unit 242 via the bus 247; the memory 252 stores at least one application 253. Hereafter, the at least one application 253 will be interchangeably referred to as the application 253. In some examples, the memories 222, 252 may be combined.

The processing unit 242 is also generally a source of audio data for playback by the speaker 101. For example audio data may be received at the processing unit 242 from the communication unit 232, described in more detail below, and/or the processing unit 242 may receive and/or generate audio data via other audio sources 255 that may include, but is not limited to, other processors that may include a processor operating a virtual assistant, a tone generator (e.g. for generating system alert tones, and the like) and the like. For example, the audio sources 225 may include one or more processors for converting communications from the communication unit 232 to audio data for playback at the speaker 101 by the speaker-controlling processor 220. As depicted, the audio sources 255 (that may be as few as one audio source 255) are located on the common bus 247.

As depicted, the communication unit 232 comprises a communication unit for one or more of WiFi, Bluetooth™, near-field communication (NFC), Long-Term Evolution (LTE) and 5G (Fifth Generation) communications. Furthermore, the memory 252 and/or the application 253 may generally be for providing memory and/or instructions to the audio processor 250 and/or the audio processing unit 242. Indeed, the audio processor 220 may comprise a second DSP. The processing unit 242 is generally configured to process audio data received from the communication unit 232 and/or generated by the audio sources 255, assign priority data to the audio data, and provide the audio data with the priority data to the speaker-controlling processing unit 211 and/or the speaker-controlling processor 220, as described below. The functionality of assigning priority data to the audio data may be located at the processor 250 and/or one or more processors of the audio sources 255, and/or any other processor of the processing unit 242.

As depicted, the processing units 211, 242 and/or the processors 220, 250 are in communication via a communication link and/or a bus 260 that may include, but is not limited to, a two-channel bus (e.g. an I2S (Inter-IC Sound) bus, and the like), or a one-channel bus (e.g. a serial bus, a synchronous serial interface (SSI) bus, and the like), and the like.

As shown in FIG. 2, the device 100 includes the communication unit 202 communicatively coupled to the common data and address bus 217 of the processing unit 211. Similarly, the communication unit 232 is communicatively coupled to the common data and address bus 247 of the processing unit 242.

The processing unit 211 may include the ROM 214 coupled to the common data and address bus 217 for storing data for initializing system components. The processing unit 211 may further include the speaker-controlling processor 220 coupled, by the common data and address bus 217, to the Random-Access Memory 213 and the static memory 222.

Similarly, the processing unit 242 may include the code ROM 244 coupled to the common data and address bus 247 for storing data for initializing respective system components. The processing unit 242 may further include the audio processor 250 coupled, by the common data and address bus 247, to the RAM 243 and the static memory 252.

However, in other examples, the processing units 211, 242 may share and/or partially share memory resources (e.g. the processing units 211, 242 may share and/or partially share a common code ROM and/or a RAM).

The communication units 202, 232 may include one or more respective wired and/or wireless input/output (I/O) interfaces 209, 239 that are configurable to communicate with one or more wired and/or wireless communication networks, and the like. However, as described above, the communication units 202, 232 may be configured for different types of communications and/or for communicating over different types of networks.

For example, the communication unit 202 may include one or more transceivers 208 and/or wireless transceivers for communicating with one or more LMR communication networks, and the like. For example, the one or more transceivers 208 may be adapted for communication with one or more of a digital mobile radio (DMR) network, a Project 25 (P25) network, a terrestrial trunked radio (TETRA) network, and the like. Hence, the one or more transceivers 208 may include, but are not limited to, a DMR transceiver, P25 transceiver, a TETRA transceiver, and the like. However, the transceivers 208 and/or wireless transceivers may be for communicating with any suitable type of communication network.

In contrast, the communication unit 232 may include one or more transceivers 238 and/or wireless transceivers adapted for communication with one or more of the Internet, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network, a Worldwide Interoperability for Microwave Access (WiMAX) network, for example operating in accordance with an IEEE 802.16 standard, and/or another similar type of wireless network. Hence, the one or more transceivers 238 may include, but are not limited to, a cell phone transceiver, a Bluetooth transceiver, a Wi-Fi transceiver, a WiMAX transceiver, and/or another similar type of wireless transceiver.

While the communication units 202, 232 are described with respect to specific types of respective communication functionality with different types of specific networks, the communication units 202, 232 may be configured to communicate on any suitable type of different respective networks. Indeed, in some examples, the communication unit 202 may be configured to communicate on one or more of a Bluetooth network, a WiFi network, an LTE network, a 5G network and the like. However, the communication units 202, 232 may be configured to communicate on different types of respective networks and/or the same and/or similar types of respective networks. In yet further examples, the respective networks with which the communications units 202, 232 are configured to communicate may be different.

The communication units 202, 232 may include one or more respective wireline transceivers 208, 238 and the like, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceivers 208, 238 are also coupled to a respective combined modulator/demodulator 210, 240.

The processors 220, 250 may include ports (e.g. hardware ports) for coupling to other hardware components of the device 100.

The speaker-controlling processing unit 211 and/or processor 220 may include one or more logic circuits, one or more processors, one or more microprocessors, and/or the speaker-controlling processing unit 211 and/or processor 220 may include one or more ASIC (application-specific integrated circuits) and one or more FPGA (field-programmable gate arrays), and/or another suitable electronic device. In some examples, the speaker-controlling processing unit 211 and/or processor 220, and/or the device 100, is not a generic processor and/or a generic device, may specifically be configured to implement functionality for controlling a speaker according to priority data. For example, in some examples, the device 100 and/or the speaker-controlling processing unit 211 and/or processor 220 specifically comprises a computer executable engine configured to implement functionality for controlling a speaker according to priority data.

Similarly, the audio processing unit 242 and/or processor 250 may include one or more logic circuits, one or more processors, one or more microprocessors, and/or the audio processing unit 242 and/or processor 250 may include one or more ASIC (application-specific integrated circuits) and one or more FPGA (field-programmable gate arrays), and/or another suitable electronic device. In some examples, the audio processing unit 242 and/or processor 250, and/or the device 100, is not a generic processor and/or a generic device, may specifically be configured to implement functionality for generating priority data for audio data. For example, in some examples, the device 100 and/or the audio processing unit 242 and/or processor 250 specifically comprises a computer executable engine configured to implement functionality for generating priority data for audio data.

The static memories 222, 252 are non-transitory machine readable media that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 100 as described herein are maintained, persistently, at the memories 222, 252 and used by the processor 220 that makes appropriate utilization of volatile storage during the execution of such programming instructions.

Figure 3:
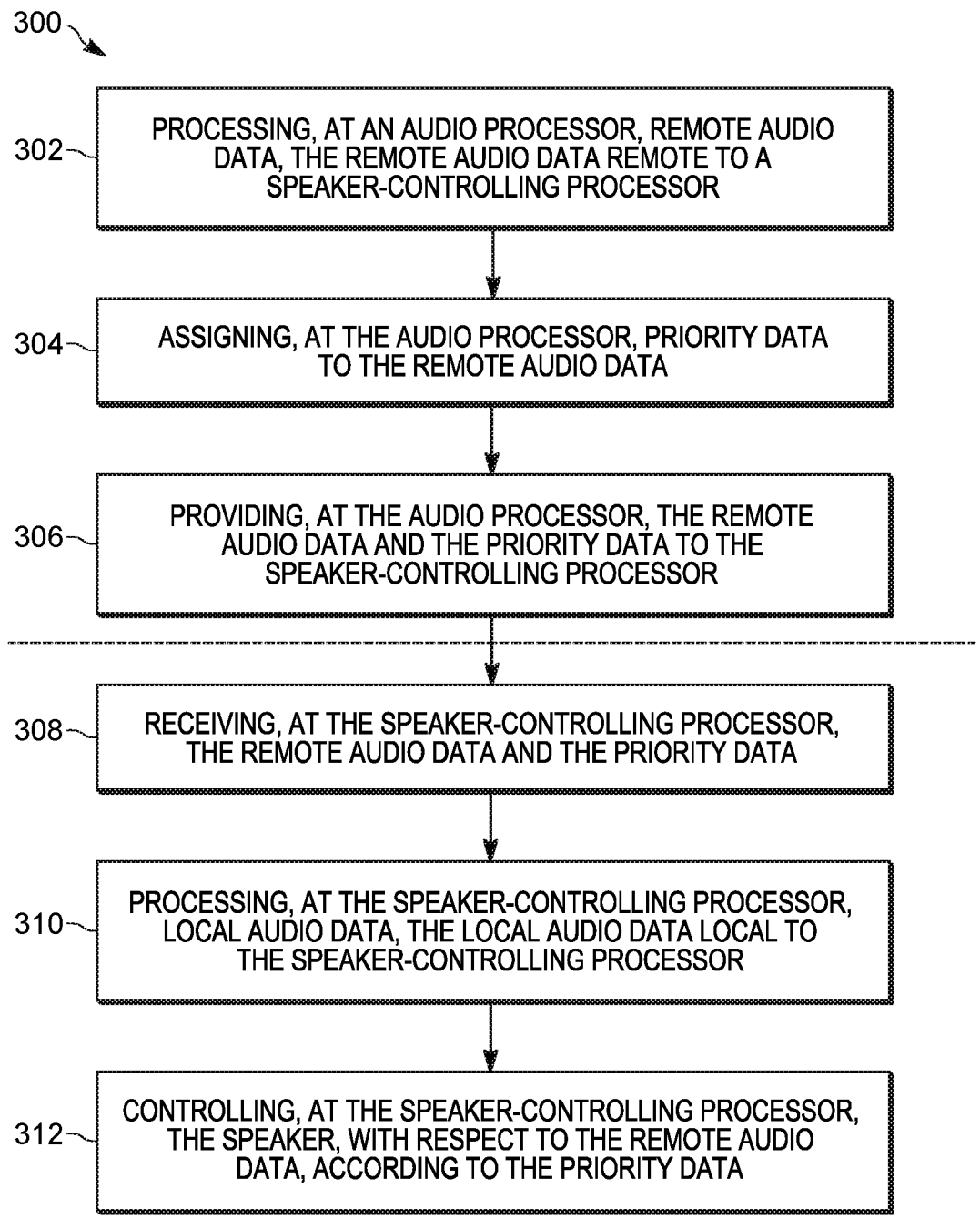
FIG. 3 is a flowchart of a method for controlling a speaker according to priority data, in accordance with some examples.

In particular, the memories 222, 252 stores instructions corresponding to the applications 223, 253 that, when respectively executed by the speaker-controlling processing unit 211 and/or processor 220, and the audio processing unit 242 and/or processor 250, enables the processing units 211, 242 and/or the processors 220, 250 to implement functionality for controlling a speaker according to priority data including, but not limited to, the blocks of the method set forth in FIG. 3.

In illustrated examples, when the audio processing unit 242 and/or processor 250 executes the one or more applications 253, the audio processing unit 242 and/or processor 250 is enabled to: process remote audio data, the remote audio data remote to the speaker-controlling processing unit 211 and/or processor 250; assign priority data to the remote audio data; and provide the remote audio data and the priority data to the speaker-controlling processing unit 211 and/or processor 250.

The one or more applications 253 may comprise a numerical algorithm for implementing the above described functionality and/or the one or more applications 253 may comprise a machine learning model and/or algorithm for implementing the above described functionality. In particular, the one or more applications 253 may comprise a machine learning model algorithm for assigning a priority to the remote audio data based, for example, on criticality and/or importance of information encoded in the remote audio data and/or a type of the remote audio data, as described in more detail below. In some of these examples, the one or more applications 253 may be operated in a training mode to "teach" a machine learning model algorithm to assign a priority to the remote audio data based, for example, on criticality and/or importance of information encoded in the remote audio data and/or a type of the remote audio data. The one or more machine learning algorithms of the application 253 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm is within the scope of present examples.

Furthermore, in illustrated examples, when the speaker-controlling processing unit 211 and/or processor 220 executes the one or more applications 223, the speaker-controlling processor 220 is enabled to: receive the remote audio data and the priority data from the audio processing unit 242 and/or processor 250; process local audio data, the local audio data local to the speaker-controlling processing unit 211 and/or processor 220; and control the speaker 101, with respect to the local audio data and the remote audio data, according to the priority data.

In some examples, when the speaker-controlling processing unit 211 and/or processor 220 executes the one or more applications 223, the speaker-controlling processor 220 may be further enabled to: assign respective priority data to the local audio data; and control the speaker 101, with respect to the remote audio data and the local audio data, according to the priority data relative to the respective priority data of the local audio data. In these examples, the one or more applications 223 may comprise a numerical algorithm for assigning respective priority data to the local audio data and/or the one or more applications 223 may comprise a machine learning model and/or algorithm for assigning respective priority data to the local audio data. In particular, the one or more applications 223 may comprise a machine learning model algorithm for assigning a priority to the local audio data based, for example, on criticality and/or importance of information encoded in the local audio data and/or a type of the local audio data, as described in more detail below. In some of these examples, the one or more applications 223 may be operated in a training mode to "teach" a machine learning model algorithm to assign a priority to the local audio data based, for example, on criticality and/or importance of information encoded in the local audio data and/or a type of the local audio data. The one or more machine learning algorithms of the application 223 may otherwise be similar to the machine learning algorithms of the application 253 as described above.

Attention is now directed to FIG. 3 that depicts a flowchart representative of a method 300 for controlling a speaker according to priority data. The operations of the method 300 of FIG. 3 correspond to machine readable instructions that are executed by the device 100, and specifically the processing units 211, 242 and/or the processors 220, 250 of the device 100. In the illustrated example, the instructions represented by the blocks of FIG. 3 are stored at the memories 222, 252 for example, as the applications 223, 253. The method 300 of FIG. 3 is one way in which the processing units 211, 242 and/or the processors 220, 250 and/or the device 100 may be configured. Furthermore, the following discussion of the method 300 of FIG. 3 will lead to a further understanding of the device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps".

Furthermore, as will be apparent in the following discussion, the block 302, the block 304 and the block 306 are performed by the audio processing unit 242 and/or processor 250, and the block 308, the block 310 and the block 312 are performed by the speaker-controlling processing unit 211 and/or processor 220. As such, the blocks 302, 304, 306, and the blocks 308, 310, 312 are separated by a dashed line indicating that the different processing units 211, 242 and/or different processors 220, 250 implement the respective blocks.

At a block 302, the audio processing unit 242 and/or processor 250 processes remote audio data, the remote audio data remote to the speaker-controlling processing unit 211 and/or processor 220. For example, the audio processing unit 242 and/or processor 250 may receive audio data from the communication unit 232 and/or the audio sources 255 and/or the audio processing unit 242 and/or processor 250 may generate audio data (e.g. via the audio sources 255). In particular examples, the remote audio data may comprise virtual assistant audio data, generated by a virtual assistant being operated at the device 100, and intended to assist a user of the device 100 with an incident scene, and the like.

The term "remote audio data" generally refers to audio data that is not generated at, or primarily processed by the speaker-controlling processing unit 211 and/or processor 220 and hence is "remote" to the speaker-controlling processing unit 211 and/or processor 220; alternatively, term "remote audio data" generally refers to audio data that is generated at, or primarily processed by the audio processing unit 242 and/or processor 250 and hence is "remote" to the speaker-controlling processing unit 211 and/or processor 220.

Similarly, the term "local audio data" generally refers to audio data that is generated at, or primarily processed by the speaker-controlling processing unit 211 and/or processor 220 and hence is "local" to the speaker-controlling processing unit 211 and/or processor 220.

At a block 304, the audio processing unit 242 and/or processor 250 assigns priority data to the remote audio data.

For example, the priority data may comprise one or more of:
A numerical value associated with a given priority. In some of these examples, audio data may be assigned an integer numerical value, and the like, such as "0", "1", "2", "3", "4", "5", "6", etc., and each numerical value may be indicative of how the speaker-controlling processing unit 211 and/or processor 220 is to control the speaker 101 with respect to local audio data and the remote audio data having the assigned numerical value.

For example, a numerical value of "6" may indicate that the local audio data is to be paused and/or buffered (e.g. playing of the local audio data (e.g. if the local audio is playing) at the speaker 101 may be interrupted when the remote audio data is received at the speaker-controlling processing unit 211 and/or processor 220) and the remote audio data is to be provided at the speaker 101; the local audio data, as paused and/or buffered, may be provided at the speaker 101 after the remote audio data is provided at the speaker 101 (e.g. the local audio data, as paused and/or buffered, may be provided at the speaker 101 after the remote audio data has completed playing at the speaker 101, and/or the local audio data may continue playing at the speaker 101 after the remote audio data has completed playing).

In another example, a numerical value of "5" may indicate that the remote audio data is to be paused and/or buffered when received at the speaker-controlling processing unit 211 and/or processor 220, and the local audio data is to be provided at the speaker 101 (e.g. the local audio data may continue playing at the speaker 101); the remote audio data, as paused and/or buffered, may be provided at the speaker 101 after the local audio data is provided at the speaker 101 (e.g. the remote audio data, as paused and/or buffered, may be provided at the speaker 101 after the local audio data has completed playing at the speaker 101). It is understood that the pausing, buffering, and the like, as described with respect to the numerical values of "5" and "6" may be referred to as "audio stream prioritization" (e.g. the local audio data and the remote audio may each comprise audio streams, which are prioritized according to the priority data); hence, in some examples, the priority data may comprise an indication of audio stream prioritization.

In another example, a numerical value of "4" may indicate that the local audio data is to be provided at the speaker 101 instead of the remote audio data, by muting the remote audio data.

In another example, a numerical value of "3" may indicate that the remote audio data is to be provided at the speaker 101 instead of the local audio data, by muting the local audio data. In another example, a numerical value of "2" may indicate that the remote audio data is to be provided at the speaker 101 mixed about equally, and/or about equally, with the local audio data.

In another example, a numerical value of "1" may indicate that the remote audio data is to be provided at the speaker 101 mixed with the local audio data, the local audio data attenuated below the remote audio data (e.g. 10 dB below the remote audio data). In another example, a numerical value of "0" may indicate that the local audio data is to be provided at the speaker 101 mixed with the remote audio data, the remote audio data attenuated below the local audio data (e.g. 10 dB below the local audio data).

However, any suitable scheme may be used to assign a numerical value, associated with a given priority, to the remote audio data. For example, numerical values of the priority data may include a subset of the numerical values as described above (e.g. "0", "1", "2", "3", "4" but not "5", "6", and/or any other suitable subset and/or numbering scheme).

Furthermore, the numerical value assigned to the remote audio data may be dependent on a type of the remote audio data and/or a criticality of the remote audio data. For example, when the remote audio data comprises audio data with critical information of a virtual assistant encoded therein, such critical virtual assistant audio data may be assigned a numerical value that causes the speaker-controlling processing unit 211 and/or processor 220 to play the critical virtual assistant audio data equal or louder than, or instead of, the local audio data (e.g. the critical virtual assistant audio data may be assigned a numerical value of "1", "2", "3", or "6"). As mentioned previously, machine learning algorithms may be used to assign priority data to the remote audio data based on criticality of information encoded therein and/or based on a type of the remote audio data.

For example, information encoded in the remote audio data that may be considered very critical, and hence assigned a numerical value of "3" or "6", may include, but is not limited to, warnings and/or announcements related to life-threatening situations (e.g. "MAN-DOWN", or "SHOTS FIRED"); information encoded in the remote audio data that may be considered somewhat critical and hence assigned a numerical value of "1", or "2", may include, but is not limited to, general announcements related to maintaining an incident scene (e.g. "Establish a 50 Meter Perimeter"); information encoded in the remote audio data that may be considered less critical and hence assigned a numerical value of "0", "4", or "5" may include, but is not limited to, general announcements related to an incident scene (e.g. "Officer Smith Has Arrived On Scene"). However, criticality may be based on any suitable criteria.

In another example, when the remote audio data comprises tones (e.g. system alert tones, and the like), and the like, such tone audio data may be assigned a numerical value that causes the speaker-controlling processing unit 211 and/or processor 220 to play the local audio data louder than, or instead of, the tone audio data (e.g. the tone audio data may be assigned a numerical value of "0", "4" or "5").

An indication of audio stream prioritization, as described above. For example, the priority data may comprise an indication to pause and/or buffer one of the remote audio data or the local audio data, while the other of the remote audio data or the local audio data plays and/or is provided at the speaker 101. As described above, after the remote audio data or the local audio data completes playing at the speaker 101, while the other of the remote audio data or the local audio data plays that is paused and/or buffered may continue to be played and/or provided at the speaker 101.

A gain setting for the remote audio data. For example, rather than a numerical and/or integer value, a gain setting may be assigned to the remote audio data, the gain setting indicative of a priority of the remote audio data. In particular, such a gain setting may comprise a positive or negative indication of a decibel value, and the like, by which the remote audio data is to be amplified or attenuated. In some examples, the gain setting may be absolute (e.g. a decibel value by which the remote audio data is to be amplified or attenuated), while in other examples the gain setting may be relative to the local audio data (e.g. decibel value by which the remote audio data is to be amplified or attenuated relative to the local audio data).

An equalization setting for the remote audio data. For example, rather than a numerical and/or integer value, an equalization setting may be assigned to the remote audio data, the equalization setting indicative of a priority of the remote audio data. In particular, such an equalization setting may comprise a positive or negative indication of a percentage or fraction, and the like, by which the remote audio data is to be equalized relative to the local audio data). For example the equalization setting may comprise a power level equalization setting that indicates that the remote audio data is to be equalized a value of 60% of power output by the speaker 101, such that the local audio data is equalized a value of 40% of power output by the speaker 101.

Alternatively, and/or in addition to, such a power level equalization setting, the equalization setting may comprise a frequency shaping level equalization setting that indicates given frequency content of the remote audio data (e.g. bass frequencies and/or ranges, treble frequencies and/or ranges) which may be emphasized, or deemphasized (e.g. played louder and/or softer) based on the priority data; an amount (e.g. a power level amount) by which the given frequency content of the remote audio data is emphasized, or deemphasized (e.g. played louder and/or softer) may be based on the power level equalization setting of the priority data and/or a predetermined power level equalization setting (e.g. stored at the memory 222 and/or at the application 223).

A mixing setting for the remote audio data. The mixing setting may include any of the aforementioned gain setting, the aforementioned equalization setting and/or any other value and/or setting for mixing the remote audio data and the local audio data, and that is indicative of a priority of the remote audio data.

At a block 306, the audio processing unit 242 and/or processor 250 provides the remote audio data and the priority data to the speaker-controlling processing unit 211 and/or processor 220. For example, the remote audio data and the priority data may be transmitted to the speaker-controlling processing unit 211 and/or processor 220 via the bus 260.

In some examples, the bus 260 may comprise a two-channel bus (e.g. the bus 260 may include a left channel and a right channel). Put another way, the speaker-controlling processing unit 211 and/or processor 220, and the audio processing unit 242 and/or processor 250, may be in communication via a two-channel bus. In these examples, the remote audio data may be provided to the speaker-controlling processing unit 211 and/or processor 220 via a first channel of the (e.g. two-channel) bus 260, and the priority data may be provided to the speaker-controlling processing unit 211 and/or processor 220 via a second channel of the (e.g. two-channel) bus 260. In particular examples, the audio data may be provided on a left channel of the two-channel bus 260 and the priority data may be provided on a right channel of the two-channel bus 260; however, in other examples, the audio data may be provided on the right channel of the two-channel bus 260 and the priority data may be provided on the left channel of the two-channel bus 260.

In some examples, the remote audio data may include mono audio data. However, in other examples, the remote audio data may include stereo audio data; in these examples, the audio processing unit 242 and/or processor 250 may be further configured to convert the stereo audio data to mono audio data prior to providing the remote audio data and the priority data to the speaker-controlling processing unit 211 and/or processor 220. For example, first and second stereo audio data (e.g. a left set of stereo data and a right set of stereo data) may be mixed and/or equally mixed (e.g. summed and divide by "2") into a set of mono stereo data.

In either example (e.g. whether the remote audio data includes mono audio data and/or whether stereo audio data is converted to mono audio data), the mono audio data may be provided to the speaker-controlling processing unit 211 and/or processor 220 via the first channel of the two-channel bus 260, and the priority data may be provided to the speaker-controlling processing unit 211 and/or processor 220 via the second channel of the two-channel bus 260.

In further examples, the bus 260 may comprise a serial bus and/or a one-channel bus. Put another way, the speaker-controlling processing unit 211 and/or processor 220 and the audio processing unit 242 and/or processor 250 may be in communication via a serial bus. In these examples, wherein the remote audio data and the priority data may be provided to the speaker-controlling processing unit 211 and/or processor 220 via the serial bus 260 by one or more of: prepending the priority data to the remote audio data; appending the priority data to the remote audio data; packet-based encoding; serial line internet protocol (SLIP) encoding; and replacing one or more frames of the remote audio data with the priority data.

In examples, where the priority data is prepended to the remote audio data and/or the priority data replaces one or more frames of the remote audio data at the beginning of the remote audio data, the speaker-controlling processing unit 211 and/or processor 220 may control the speaker 101, with respect to the local audio data and the remote audio data, according to the priority data upon receipt of the remote audio data and the priority data. However, in examples where the priority data is appended to the remote audio data and/or the priority data replaces one or more frames of the remote audio data not at the beginning of the remote audio data, the speaker-controlling processing unit 211 and/or processor 220 may buffer (e.g. at the memory 222, and the like) the remote audio data until the priority data is received and, in response to receiving the priority data, control the speaker 101, with respect to the local audio data and the remote audio data (e.g. as buffered), according to the priority data.

Furthermore, in examples where the bus 260 comprises a serial bus 260, the remote audio data may comprise mono audio data or stereo audio data; when the remote audio data comprises stereo audio data, the stereo audio data may be converted to mono audio data and/or the first and second stereo audio data may be serially streamed to the speaker-controlling processing unit 211 and/or processor 220 and buffered until both the first and second stereo audio data and the priority data is received.

When the remote audio data and the priority data is provided to the speaker-controlling processing unit 211 and/or processor 220 via the serial bus 260 via packet-based encoding, the remote audio data and the priority data may be converted to packets in any suitable manner and/or provided with any suitable packet-based data (e.g. headers, and the like). Similarly, when the remote audio data and the priority data is provided to the speaker-controlling processing unit 211 and/or processor 220 via the serial bus 260 via SLIP encoding, the remote audio data and the priority data may be provided with any suitable SLIP encoding-based data (e.g. escape characters, and the like).

In some examples, at the block 306, the audio processing unit 242 and/or processor 250 may provide the priority data to the speaker-controlling processing unit 211 and/or processor 220 with any suitable data that may assist the speaker-controlling processing unit 211 and/or processor 220 with mixing the remote audio data and the local audio data. Such data that may assist the speaker-controlling processing unit 211 and/or processor 220 with mixing the remote audio data and the local audio data may include, but is not limited to:

A sampling rate of the remote audio data. For example, the sampling rate may comprise a rate that the remote audio data was sampled (e.g. in hertz and/or a number of samples per second, and the like).

An indication of an audio source of the remote audio data. For example, a particular audio source may be selected from the remote audio data for playback at the speaker 101. Put another way, the remote audio data may comprise audio data from different audio sources (e.g. a Bluetooth network (e.g. via the communication unit 232), an LTE network (e.g. via the communication unit 232), a virtual assistant (e.g. via the audio sources 255), system alert tones (e.g. via the audio sources 255), and the like), the remote audio data may include data that indicates which portions of the remote audio data are associated with particular audio sources.

An audio quality setting of the remote audio data. For example, the audio quality setting may include, but is not limited to, a bit rate, an encoding format and/or the aforementioned sampling rate.

Metadata associated with the remote audio data. Such metadata may include any of the aforementioned sampling rate, indication of an audio source, audio quality setting and/or any other metadata that may assist the speaker-controlling processing unit 211 and/or processor 220 with mixing the remote audio data and the local audio data.

At a block 308, the speaker-controlling processing unit 211 and/or processor 220 receives the remote audio data and the priority data from the audio processing unit 242 and/or processor 220, for example on the bus 260, as described above.

At a block 310, the speaker-controlling processing unit 211 and/or processor 220 processes local audio data, the local audio data local to the speaker-controlling processing unit 211 and/or processor 220. For example, the local audio data may be received from the communication unit 202 and/or the audio sources 225, as described above. The block 310 may occur in parallel to any of the block 302, the block 304, the block 306 and the block 308.

At a block 312, the speaker-controlling processing unit 211 and/or processor 220 controls the speaker 101, with respect to the local audio data and the remote audio data, according to the priority data. For example, as described above, the speaker-controlling processing unit 211 and/or processor 220 may control the speaker 101, with respect to the local audio data and the remote audio data, according to the priority data by one or more of: providing the remote audio data at the speaker instead of the local audio data by muting the local audio data; providing the remote audio data at the speaker mixed with the local audio data, the local audio data attenuated below the remote audio data; providing the remote audio data at the speaker mixed about equally with the local audio data; providing the local audio data at the speaker instead of the remote audio data by muting the remote audio data; providing the local audio data at the speaker mixed with the remote audio data, the remote audio data attenuated below the local audio data; providing the local audio data at the speaker while one or more of pausing and buffering the remote audio data; and providing the remote audio data at the speaker while one or more of pausing and buffering the local audio data. In particular, as described above, the priority data generally indicates to the speaker-controlling processing unit 211 and/or processor 220 how the speaker 101 is to be controlled, according to numerical value, an indication of audio stream prioritization, a gain setting for the remote audio data, an equalization setting for the remote audio data, a mixing setting for the remote audio data, and the like.

Furthermore, the speaker-controlling processing unit 211 and/or processor 220 may mix the remote audio data and the local audio data for playback by the speaker 101 based on any data received with the priority data that is intended to assist speaker-controlling processing unit 211 and/or processor 220 with such mixing, as described above (e.g. the afore mentioned metadata for the remote audio data, and the like). It is further understood that the speaker-controlling processing unit 211 and/or processor 220 may further have access to similar metadata for the local audio data that may also assist the speaker-controlling processing unit 211 and/or processor 220 with mixing the remote audio data and the local audio data.

In some examples, the local audio data is processed without respective priority being assigned to the local audio data.

However, in other examples, the method 300 may further comprise the speaker-controlling processing unit 211 and/or processor 220: assigning respective priority data to the local audio data; and controlling the speaker 101, with respect to the remote audio data and the local audio data, according to the priority data relative to the respective priority data of the local audio data.

For example, the local audio data may be assigned respective priority data in a manner similar to as described above with respect to the remote audio being assigned the priority data at the block 304. In particular, the local audio data may be assigned respective priority data based on a respective criticality of information encoded in the local audio data.

In examples where both the remote audio data and the local audio data are assigned respective priority data, the speaker-controlling processing unit 211 and/or processor 220 may control the speaker 101 (e.g. at the block 312) according to a difference between the assigned respective priority data, and the like. For example, when the respective priority data of the remote audio data and the local audio data each comprise a respective numerical value, a difference between the respective numerical values may be determined and used to control the speaker 101. Hence, when one of the remote audio data and the local audio data has a higher priority, as indicated by the respective numerical values and/or a difference therebetween, the speaker 101 may be controlled such that the audio data having the higher priority is played louder and/or instead of the other audio data. When the respective priority data of the remote audio data and the local audio data each comprise a respective gain setting and/or equalization setting, the respective gain settings and/or equalization settings may be normalized against each other and the speaker 101 may be controlled accordingly. Indeed, normalized priority data may be used to control the speaker 101, regardless of a format of the priority data.

In some of examples, the audio processing unit 242 and/or processor 250 may be configured to: combine (e.g. at the block 302 of the method 300) a plurality of remote audio data (e.g. from one or more of the audio sources 255 and/or the communication unit 232) into a single set of combined remote audio data; assign (e.g. at the block 304 of the method 300) a single set of priority data to the combined remote audio data; and provide (e.g. at the block 306 of the method 300) the combined remote audio data and single set of priority data to the speaker-controlling processing unit 211 and/or processor.

In some examples, the remote audio data may be received at the speaker-controlling processing unit 211 and/or processor 220, without local audio data being processed at the speaker-controlling processing unit 211 and/or processor 220. In these examples, the speaker-controlling processing unit 211 and/or processor 220 may ignore and/or discard the priority data may not be used and/or discarded, and provide the remote audio data at the speaker 101 (e.g. regardless of what is indicated by the priority data).

In some examples, device 100 may be adapted to include more than one bus 260 between the audio processing unit 242 and/or processor 250 and the speaker-controlling processing unit 211 and/or processor 220. In some of these examples, the audio processing unit 242 and/or processor 250 may be adapted and/or further configured to process (e.g. at the block 302 of the method 300), a plurality of remote audio data, for example in parallel, from different audio sources (e.g. the communication unit 232 and the audio sources 255). In these examples, the audio processing unit 242 and/or processor 250 may be adapted and/or further configured to: (e.g. at the block 304 of the method 300) assign respective priority data to the plurality of remote audio data; and provide (e.g. at the block 306 of the method 300) the plurality of remote audio data and the respective priority data to the speaker-controlling processing unit 211 and/or processor 220 in parallel, for example on a plurality of buses (e.g. including the bus 260). In these examples, the speaker-controlling processing unit 211 and/or processor 220 may be adapted and/or further configured to: receive (e.g. at the block 308 of the method 300) the plurality of remote audio data and the respective priority data (e.g. in parallel); and control (e.g. at the block 312 of the method 300) the speaker 101, with respect to the plurality of remote audio data, according to the respective priority data. For example, differences between the respective priority data and/or normalized priority data may be used to control the speaker 101, as described above. In some of these examples, the audio processing unit 242 and/or processor 250 may combine the plurality of remote audio data, assign a single set of priority data to the combined remote audio data, as described above, and provide the combined remote audio data and the single set of priority data to the speaker-controlling processing unit 211 and/or processor 220 on one bus of the plurality of busses (e.g. the bus 160).

In some examples, the device 100 may comprise a plurality of audio processing units and/or processors, including the at least one audio processing unit 242 and/or processor 250. For example, plurality of audio processing units and/or processors may be in communication with the speaker-controlling processing unit 211 and/or processor 220 via respective buses (e.g. including the bus 260). In these examples, the plurality of audio processing units and/or processors may be configured to: process (e.g. at the block 302 of the method 300) respective remote audio data; assign (e.g. at the block 304 of the method 300) respective priority data to the respective remote audio data; and provide (e.g. at the block 306 of the method 300) the respective remote audio data and the respective priority data to the speaker-controlling processing unit 211 and/or processor 220 (e.g. on respective buses therebetween, including the bus 260). In these examples, the speaker-controlling processing unit 211 and/or processor 220 may be adapted and/or further configured to: receive (e.g. at the block 308 of the method 300) the plurality of remote audio data and the respective priority data (e.g. in parallel from the plurality of audio processing units and/or processors, for example on respective buses); and control (e.g. at the block 312 of the method 300) the speaker 101, with respect to the respective remote audio data, according to the respective priority data, as received from the plurality of audio processors. For example, differences between the respective priority data and/or normalized priority data may be used to control the speaker 101, as described above.

Figure 4:
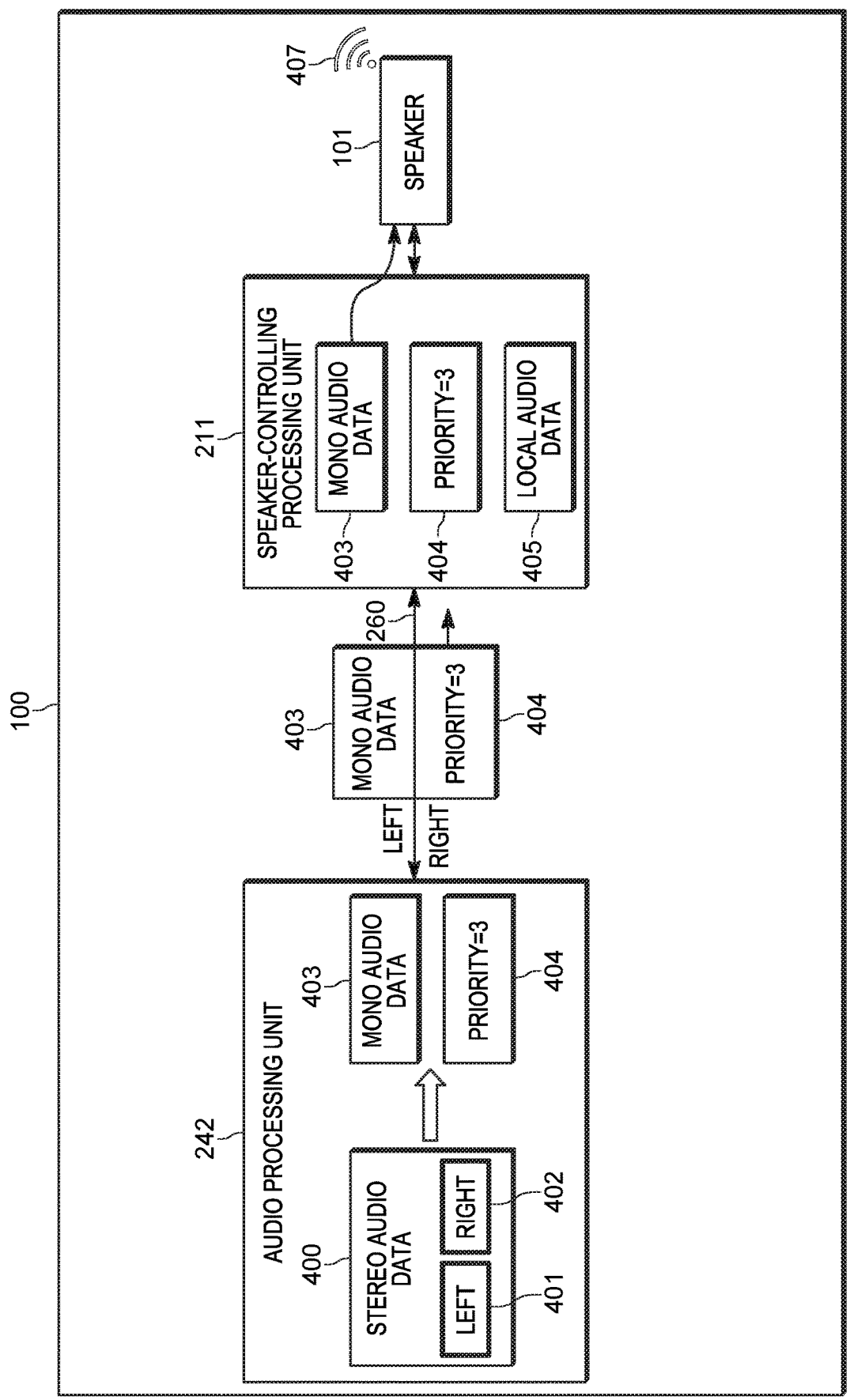
FIG. 4 depicts the device of FIG. 1 implementing a method for controlling a speaker according to priority data using a two-channel bus, in accordance with some examples.
Figure 5:
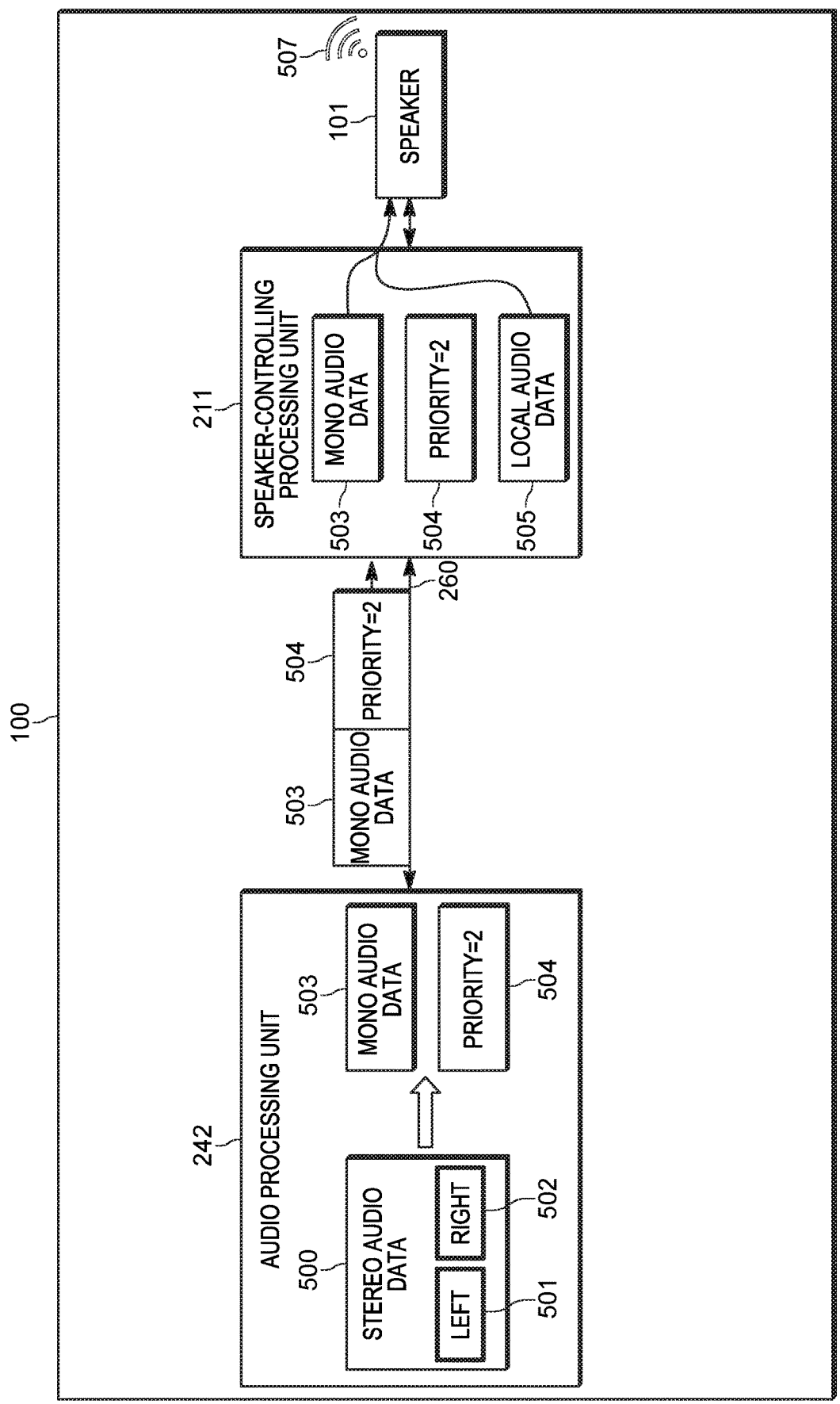
FIG. 5 depicts the device of FIG. 1 implementing a method for controlling a speaker according to priority data using a serial bus and/or a one-channel bus, in accordance with some examples.

Attention is next directed to FIG. 4 and FIG. 5 that depict examples of the method 300. For simplicity, FIG. 4 and FIG. 5 depict the device 100 with only the processing units 211, 242, though it is understood that other components of the device 100 are present.

In the example of FIG. 4, the bus 260 is understood to comprise a two-channel bus. As also depicted in FIG. 4, the audio processing unit 242 has received and/or has generated stereo audio data 400 comprising left audio data 401 and right audio data 402. As depicted, the audio processing unit 242 processes (e.g. at the block 302 of the method 300) the stereo audio data 400 that, as depicted, includes converting the left audio data 401 and right audio data 402 of the stereo audio data 400 to mono audio data 403. As depicted, the audio processing unit 242 assigns (e.g. at the block 304 of the method 300) priority data 404 to the mono audio data 403 (e.g. and/or the stereo audio data 400. For example, as depicted, the audio data 403 has been assigned a numerical value of "3" (e.g. "Priority=3").

As further depicted in FIG. 4, the audio processing unit 242 provides (e.g. at the block 306 of the method 300) the mono audio data 403 and the priority data 404 to the speaker-controlling processing unit 211 via the bus 260, that, as described above, is understood to comprise a two-channel bus that includes a left and right channel (e.g. respectively labelled "LEFT" and "RIGHT" in FIG. 4). As depicted, the audio processing unit 242 provides the mono audio data 403 on the left channel of the bus 260, and the priority data 404 on the right channel of the bus 260.

As further depicted in FIG. 4, the speaker-controlling processing unit 211 receives (e.g. at the block 308 of the method 300) the mono audio data 403 and the priority data 404, and further is depicted as processing (e.g. at the block 310 of the method 300) local audio data 405. Indeed, it is understood that the mono audio data 403 (e.g. and/or the stereo audio data 400) comprises remote audio data, as described above.

As the priority data 404 has been assigned a numerical value of "3", that may indicate that remote audio data is to be provided at the speaker 101 instead of local audio data, the speaker-controlling processing unit 211 controls (e.g. at the block 312 of the method 300) the speaker 101 to provide and/or play the mono audio data 403, for example as sound 407, and mute the local audio data 405.

Attention is next directed to the example of FIG. 5, in which the bus 260 is understood to comprise a serial bus and/or a one-channel bus. As also depicted in FIG. 5, the audio processing unit 252 has received and/or has generated stereo audio data 500 comprising left audio data 501 and right audio data 502. As depicted, the audio processing unit 242 processes (e.g. at the block 302 of the method 300) the stereo audio data 500 that, as depicted, includes converting the left audio data 501 and right audio data 502 of the stereo audio data 500 to mono audio data 503. As depicted, the audio processing unit 242 assigns (e.g. at the block 304 of the method 300) priority data 504 to the mono audio data 503 (e.g. and/or the stereo audio data 500. For example, in contrast to the example of FIG. 4, as depicted in FIG. 5 the audio data 503 has been assigned a numerical value of "2" (e.g. "Priority=2").

As further depicted in FIG. 5, the audio processing unit 242 provides (e.g. at the block 306 of the method 300) the mono audio data 503 and the priority data 504 to the speaker-controlling processing unit 211 via the bus 260, that, as described above, is understood to comprise a serial bus and/or a one-channel bus. In the depicted example, the audio processing unit 242 prepends the priority data 504 to the mono audio data 503 and transmits the priority data 504 and the mono audio data 503 to the speaker-controlling processing unit 211 via the bus 260.

As further depicted in FIG. 5, the speaker-controlling processing unit 211 receives (e.g. at the block 308 of the method 300) the mono audio data 503 and the priority data 504, and further is depicted as processing (e.g. at the block 310 of the method 300) local audio data 505. Indeed, it is understood that the mono audio data 503 (e.g. and/or the stereo audio data 500) comprises remote audio data, as described above.

As the priority data 504 has been assigned a numerical value of "2", that may indicate that that remote audio data is to be provided at the speaker 101 mixed equally, and/or about equally, with the local audio data, the speaker-controlling processing unit 211 controls (e.g. at the block 312 of the method 300) the speaker 101 to provide and/or play the mono audio data 503 mixed equally, and/or about equally, with the local audio data 505; for example as depicted, the speaker 101 plays sound 507 that is understood to include the mono audio data 503 and the local audio data 505 mixed equally, and/or about equally.

Hence, provided herein is a device with two processing units and/or processors in which one of the processing units and/or processors controls a speaker to provide audio data from the other of the processing units and/or processors according to priority data. Such priority data may ensure that critical data is played at the speaker, that is in contrast to other devices that may mix audio data without prioritizing the audio data, that may cause such critical information to be obscured.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
    a speaker;
    a speaker-controlling processor configured to:
       process local audio data, the local audio data local to the speaker-controlling processor; and
       control the speaker; and
    at least one audio processor in communication with the speaker-controlling processor, the at least one audio processor configured to:
       process remote audio data, the remote audio data remote to the speaker-controlling processor;
       assign priority data to the remote audio data; and
       provide the remote audio data and the priority data to the speaker-controlling processor,
    the speaker-controlling processor further configured to control the speaker, with respect to the local audio data and the remote audio data, according to the priority data,
    wherein the speaker-controlling processor and the at least one audio processor are in communication via a two-channel stereo bus having a left channel and a right channel, and the remote audio data includes stereo audio data comprising left audio data and right audio data,
    wherein the at least one audio processor is further configured to:
       convert the left audio data and the right audio data, of the stereo data, to mono audio data, prior to providing the remote audio data and the priority data to the speaker-controlling processor; and
       provide the remote audio data and the priority data to the speaker-controlling processor by:
          providing the mono audio data to the speaker-controlling processor via a first channel of the left channel and the right channel of the two-channel stereo bus; and
          providing the priority data the speaker-controlling processor via a second channel of the left channel and the right channel of the two-channel stereo bus.

2. The device of claim 1, wherein the speaker-controlling processor is further configured to:
    control the speaker, with respect to the local audio data and the remote audio data, according to the priority data, by one or more of:
       providing the remote audio data at the speaker instead of the local audio data by muting the local audio data;
       providing the remote audio data at the speaker mixed with the local audio data, the local audio data attenuated below the remote audio data;
       providing the remote audio data at the speaker mixed about equally with the local audio data;
       providing the local audio data at the speaker instead of the remote audio data by muting the remote audio data;
       providing the local audio data at the speaker mixed with the remote audio data, the remote audio data attenuated below the local audio data;
       providing the local audio data at the speaker while one or more of pausing and buffering the remote audio data; and
       providing the remote audio data at the speaker while one or more of pausing and buffering the local audio data.

3. The device of claim 1, wherein the speaker-controlling processor is further configured to:
assign respective priority data to the local audio data; and
control the speaker, with respect to the remote audio data and the local audio data, according to the priority data relative to the respective priority data of the local audio data.

4. The device of claim 1, wherein the priority data comprises one or more of:
a numerical value associated with a given priority;
an indication of audio stream prioritization;
a gain setting for the remote audio data;
an equalization setting for the remote audio data; and
a mixing setting for the remote audio data.

5. The device of claim 1, wherein, to assist the speaker-controlling processor with mixing the remote audio data and the local audio data, the priority data is provided with one or more of:
metadata associated with the remote audio data;
a sampling rate of the remote audio data;
an indication of an audio source of the remote audio data; and
an audio quality setting of the remote audio data.

6. The device of claim 1, wherein:
the at least one audio processor is further configured to: process a plurality of remote audio data; assign respective priority data to the plurality of remote audio data; and provide the plurality of remote audio data and the respective priority data to the speaker-controlling processor in parallel, and
the speaker-controlling processor is further configured to control the speaker, with respect to the plurality of remote audio data, according to the respective priority data.

7. The device of claim 1, further comprising:
a plurality of audio processors, including the at least one audio processor,
the plurality of audio processors configured to: process respective remote audio data; assign respective priority data to the respective remote audio data; and provide the respective remote audio data and the respective priority data to the speaker-controlling processor, and
the speaker-controlling processor is further configured to control the speaker, with respect to the respective remote audio data, according to the respective priority data, as received from the plurality of audio processors.

8. A method comprising:
processing, at an audio processor in communication with a speaker-controlling processor, remote audio data, the remote audio data remote to the speaker-controlling processor;
assigning, at the audio processor, priority data to the remote audio data;
providing, at the audio processor, the remote audio data and the priority data to the speaker-controlling processor;
processing, at the speaker-controlling processor, local audio data, the local audio data local to the speaker-controlling processor; and
controlling, at the speaker-controlling processor, a speaker, with respect to the local audio data and the remote audio data, according to the priority data,
wherein the speaker-controlling processor and the at least one audio processor are in communication via a two-channel stereo bus having a left channel and a right channel, and the remote audio data includes stereo audio data comprising left audio data and right audio data, and
wherein the method further comprises:
converting, at the audio processor, the left audio data and the right audio data, of the stereo audio data, to mono audio data, prior to providing the remote audio data and the priority data to the speaker-controlling processor; and
providing, at the audio processor, the remote audio data and the priority data to the speaker-controlling processor by:
providing, at the audio processor, the mono audio data to the speaker-controlling processor via a first channel of the left channel and the right channel of the two-channel stereo bus; and
providing, at the audio processor, the priority data the speaker-controlling processor via a second channel of the left channel and the right channel of the two-channel stereo bus.

9. The method of claim 8, further comprising:
controlling, at the speaker-controlling processor, the speaker, with respect to the local audio data and the remote audio data, according to the priority data, by one or more of:
providing the remote audio data at the speaker instead of the local audio data by muting the local audio data;
providing the remote audio data at the speaker mixed with the local audio data, the local audio data attenuated below the remote audio data;
providing the remote audio data at the speaker mixed about equally with the local audio data;
providing the local audio data at the speaker instead of the remote audio data by muting the remote audio data;
providing the local audio data at the speaker mixed with the remote audio data, the remote audio data attenuated below the local audio data;
providing the local audio data at the speaker while one or more of pausing and buffering the remote audio data; and
providing the remote audio data at the speaker while one or more of pausing and buffering the local audio data.

10. The method of claim 8, further comprising:
assigning, at the speaker-controlling processor, respective priority data to the local audio data; and
controlling, at the speaker-controlling processor, the speaker, with respect to the remote audio data and the local audio data, according to the priority data relative to the respective priority data of the local audio data.

11. The method of claim 8, wherein the priority data comprises one or more of:
a numerical value associated with a given priority;
an indication of audio stream prioritization;
a gain setting for the remote audio data;
an equalization setting for the remote audio data; and
a mixing setting for the remote audio data.

12. The method of claim 8, wherein, to assist the speaker-controlling processor with mixing the remote audio data and the local audio data, the priority data is provided, by the audio processor to the speaker-controlling processor, with one or more of:
metadata associated with the remote audio data;
a sampling rate of the remote audio data;

an indication of an audio source of the remote audio data; and an audio quality setting of the remote audio data.

13. The method of claim 8, further comprising:

processing, at the audio processor, a plurality of remote audio data;

assigning, at the audio processor, respective priority data to the plurality of remote audio data;

providing, at the audio processor, the plurality of remote audio data and the respective priority data to the speaker-controlling processor in parallel; and controlling, at the speaker-controlling processor, the speaker, with respect to the plurality of remote audio data, according to the respective priority data.

14. The method of claim 8, further comprising:

processing, at a plurality of audio processors, including the audio processor, respective remote audio data;

assigning, at the plurality of audio processors, respective priority data to the respective remote audio data;

providing, at the plurality of audio processors, the respective remote audio data and the respective priority data to the speaker-controlling processor; and controlling, at the speaker-controlling processor, the speaker, with respect to the respective remote audio data, according to the respective priority data, as received from the plurality of audio processors.

* * * * *